United States Patent Office 3,191,945
Patented June 29, 1965

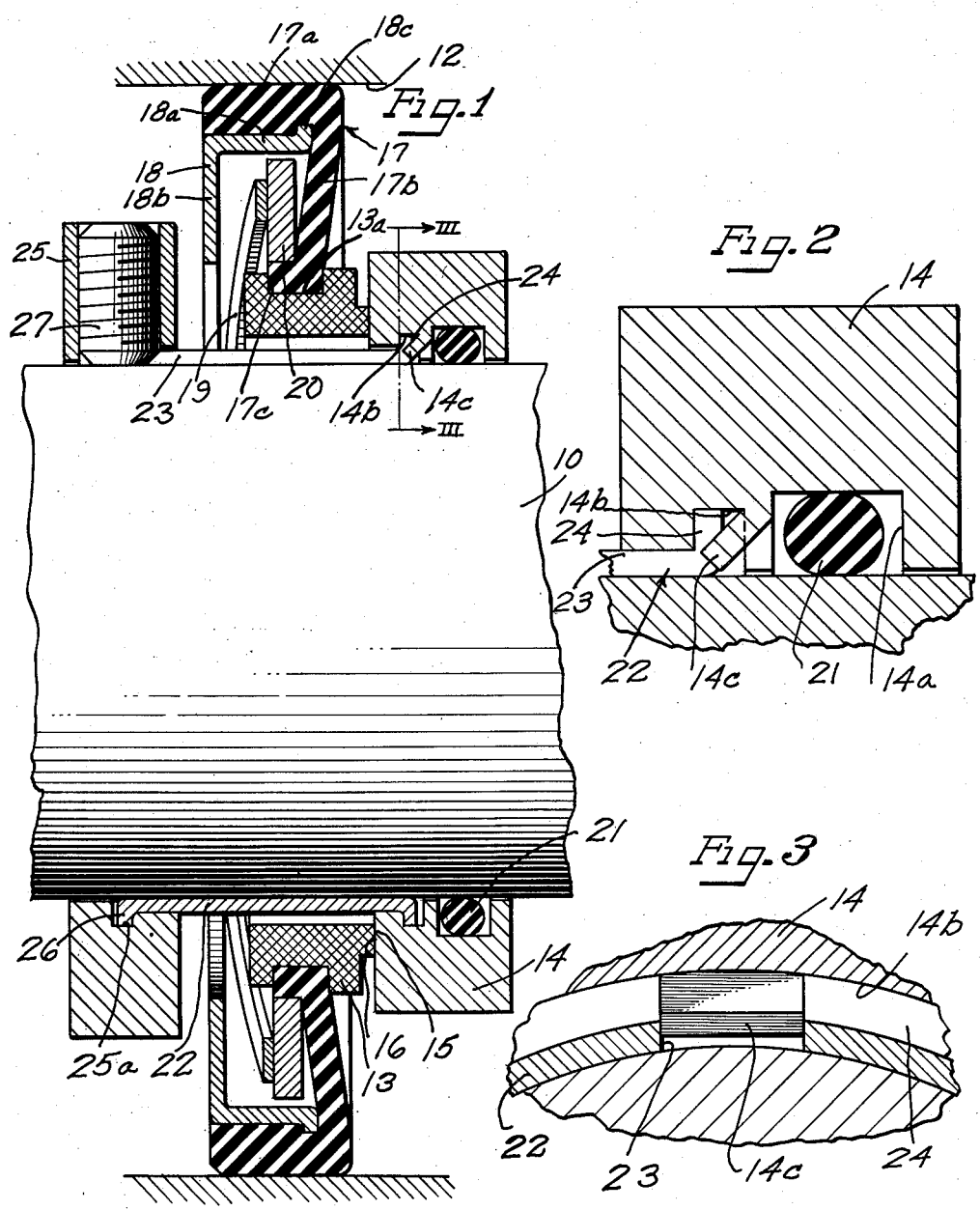

3,191,945
ROTARY SEAL WITH SUPPORTING SLEEVE
Raymond H. Andresen, Barrington, Ill., assignor to Gits Bros. Mfg. Co., Chicago, Ill., a corporation of Delaware
Filed Mar. 18, 1963, Ser. No. 265,882
8 Claims. (Cl. 277—65)

The present invention relates to improvements in rotary shaft seals and particularly to an improved seal which is assembled as a compact unit.

The invention contemplates the provision in a preferred embodiment of a unit seal assembly which is of a structure such that economy of construction and compactness is inherent in the design. The sealing assembly generally will include a non-rotatable sealing ring carried on a flexible diaphragm portion of a carrier ring which is of resilient material and has an outer portion to resiliently fit into a bore in a housing allowing considerable bore tolerance. The seal further generally includes a rotatable mating ring which carries an O-ring for radially positioning it on a shaft in which it is axially positioned by a split torque sleeve formed of light material such as sheet metal and having a gap so that it may be circumferentially contracted and released to have flanges at the ends seat in grooves in the mating ring and in a torque ring and which in its expanded position can be slid over a shaft.

Accordingly, it is an object of the present invention to provide an improved rotary seal assembly of the above general nature wherein an inherently compact seal assembly is obtained with the support for the mating ring extending along the shaft inside of the sealing ring and the elements for supporting the sealing ring.

A further object of the invention is to provide an improved rotary seal assembly wherein the mating ring is positively driven on a shaft by a simplified and reliable mounting collar and screw.

Another object of the invention is to provide an improved seal assembly wherein the assembled unit fits into a bore in a housing by means of a rubber-to-metal contact allowing considerable bore tolerance.

Yet another object of the invention is to provide a seal wherein the sealing ring is bonded to a supporting diaphragm and the diaphragm is an integral part of a supporting carrier ring to eliminate possible leakage.

A still further object of the invention is to provide an improved support for mounting a mating ring on a rotating shaft which is easy to install on the shaft, is of inexpensive construction, and which can be positively locked to the shaft in a rotary direction.

Other objects, features and advantages will become more apparent with the teaching of the principles of the invention in connection with the disclosure of the preferred embodiment thereof in the specification, claims and drawings, in which:

FIGURE 1 is a vertical sectional view taken through a seal assembly embodying the principles of the present invention, shown in position on a shaft;

FIGURE 2 is an enlarged fragmentary detailed view showing the structure for supporting the mating sealing ring on the shaft; and FIGURE 3 is an enlarged fragmentary sectional view taken substantially along line III—III of FIGURE 1.

On the drawings:
As illustrated in FIGURE 1, the rotary seal assembly is utilized for providing a seal around a rotating shaft 10 extending through a wall of a housing 11 with a cylindrical opening 12 therein.

The relatively rotating seal includes a sealing ring 13 formed of carbon or similar suitable long-wearing material and a mating ring 14. The sealing ring has an annular radial smooth sealing face 15 which sealingly engages an annular radial sealing surface 16 on the mating ring 14.

Sealing ring and support

The sealing ring 13 is supported on a carrier ring 17 which is of a resilient material such as rubber or neoprene with the material being selected in accordance with the fluid to be sealed. The sealing ring 17 has an annular first outer portion 17a which is resilient and has a cylindrical outer surface for seating against the inner surface 12 of the housing. The carrier ring is thus compressed against the housing surface 12 and frictionally seats therein so that close manufacturing tolerances are unnecessary and so that the seal assembly can fit into openings of dimensions which may vary. The carrier ring 17 has a second diaphragm portion 17b which extends generally radially inwardly and is flexible to accommodate axial movement of the sealing ring 13.

The sealing ring has an outwardly facing annular groove 13a which receives a flanged inner edge 17c of the carrier ring, and the diaphragm is bonded to the sealing ring 13 along a surface of contact to prevent leakage.

The flange 17c extends axially away from the sealing face 15 of the sealing ring and provides an outwardly facing shoulder which supports a washer 20.

A loading spring 19 bears against the washer 20 for applying an axial force and holding the sealing ring 13 in sealing engagement with the mating ring 14.

Within the outer portion 17a of the carrier ring is an annular shell or backing ring 18. The backing ring has an outer axially extending annular portion 18a which supports the outer portion 17a of the carrier ring. This support holds the carrier ring firmly in frictional and sealing engagement with the surface 12 of the housing. The portion 18a of the ring has an outwardly turned lip 18c at its end which projects into a groove in the carrier ring for holding the backing ring 18 in position within the carrier ring.

The backing ring 18 has a radially inwardly extending annular flange portion 18b which engages the spring 19 to provide a backing therefor. The spring 19 may take various forms and may be a wave spring or an annular coil compression spring, or in some circumstances separate individual springs may be used around the circumference of the washer 20.

Mating ring and support

The mating ring 14 has an inwardly facing annular groove 14a which receives a resilient O-ring 21. The mating ring has an inner diameter slightly larger than the shaft so that its radial position is resiliently determined by the O-ring 21, and so that it can be easily slid axially into position on the shaft.

The mating ring 14 is accurately supported in a plane at right angles to the axis of the shaft 10, and is driven in rotation on the shaft by a sleeve 22.

The sleeve 27 is split so as to form an axially extending gap 23 therealong, FIGURES 1 and 3. The sleeve is formed of a lightweight inexpensive material such as sheet metal which is rolled to the diameter of the shaft 10. This provides a resilient inexpensive member avoiding the necessity of an expensive machined part which would be difficult to manufacture and costly, particularly in large diameter sizes.

At one end the sleeve has an outwardly turned flange 24 which seats in an annular groove 14b in the mating ring 14. For assembly of the device the sleeve can be radially compressed to close the gap and positioned within the mating ring 14, and then expanded so that the flange 24 seats in the groove 14b.

The mating ring has an inwardly extending finger 14c, FIGURES 2 and 3, which projects into the gap 23 of the sleeve. This positively drives the mating ring with rotation of the shaft. Further, the flange 24 positively locates the mating ring in an axial direction and accurately positions it in a radial plane at right angles to the shaft axis. The mating ring will take an operating position as shown in FIGURE 2 with the side of the groove 14b engaging the side of the flange 24 due to the force exerted against the mating ring 14 by the sealing ring 13.

At the other end of the sleeve 23 is a torque collar or ring 25. The torque collar has an inwardly facing groove 25a which receives an outwardly turned flange 26 at the end of the sleeve.

Thus when the sleeve is compressed inwardly and the mating ring 14 is positioned over one end, the sealing ring 13 and its support are slid over the sleeve, and the torque collar is thereafter placed over the other end. When the sleeve is expanded outwardly the flange 26 will seat in the groove 25a and the flange 24 will seat in the groove 14b. The assembly can then be slid into position on a shaft with the carrier ring 17a seated in the opening 12 of the housing. The carrier ring and its supporting sleeve can then be moved axially for the correct tension of the spring 19. The set screw 27 is then turned down against the shaft for locking the sleeve in place. The set screw is aligned with the gap 23 in the sleeve to clear the sleeve and engage the shaft.

Thus it will be seen that I have provided an improved seal structure which meets the objects, advantages and features above set forth. The structural embodiment provides a very compact unit and the parts can be readily maintained together for storage until ready for use.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. In a rotary seal assembly, the combination comprising,
   a non-rotatable sealing ring having an annular radial sealing face,
   a rotatable mating ring having an annular radial sealing surface for sealing engagement with said face,
   means for urging said sealing ring axially into sealing engagement with said mating ring,
   a supporting sleeve extending coaxially within said sealing ring with axial ends extending in both directions axially beyond the sealing ring,
      said sleeve being split axially with an axially extending gap therein said being flexible for conforming to the outer surface of a shaft,
   shaft engaging torque means at one end of the sleeve for positively connecting the sleeve to a shaft,
   and mating ring engaging means at the other end of the sleeve for connecting the sleeve to the mating ring for fixing the position of the mating ring.

2. In a rotary seal assembly, the combination comprising,
   a non-rotatable sealing ring having an annular radial sealing face,
   a rotatable mating ring having an annular radial sealing surface for sealing engagement with said face,
   means for urging said sealing ring axially into sealing engagement with said mating ring,
   a supporting sleeve extending coaxially within said sealing ring with axial ends extending beyond the sealing ring in both axial directions,
   shaft engaging torque means at one end of the sleeve for positively connecting the sleeve to a shaft,
   and mating ring engaging means at the other end of the sleeve for connecting the sleeve to the mating ring for fixing the position of the mating ring.

3. In a rotary seal assembly, the combination comprising,
   a non-rotatable sealing ring having an annular radial sealing face,
   a rotatable mating ring having an annular radial sealing surface for sealing engagement with said face,
   a spring urging said sealing ring axially into sealing engagement with said mating ring,
   a supporting sleeve extending coaxially within said sealing ring with axial ends extending beyond the sealing ring in both axial directions and having an inner cylindrical surface for positively engaging a shaft to fix the position of the sleeve,
   connecting means having an element on said mating ring and another mating element on said sleeve with said elements having a positive engaging position fixing the position of the mating ring in a plane at right angles to the axis of the shaft,
   and shaft engaging torque means for positively connecting the sleeve to the shaft.

4. In a rotary seal assembly, the combination comprising,
   a non-rotatable sealing ring having an annular radial sealing face,
   a rotatable mating ring having an annular radial sealing surface for sealing engagement with said face,
   a spring urging said sealing ring axially into sealing engagement with said mating ring,
   a supporting sleeve split axially with an axially extending gap,
   a radially outwardly etxending flange at one axial end of said sleeve,
   an inwardly facing groove on said mating ring receiving said flange so that the sleeve can be radially compressed for positioning said flange in said groove and expanded for positively positioning the mating ring on said sleeve,
   and shaft engaging torque means for positively connecting the sleeve to a shaft.

5. In a rotary seal assembly, the combination comprising,
   a non-rotatable sealing ring having an annular radial sealing face,
   a rotatable mating ring having an annular radial sealing face,
   a spring urging said sealing ring axially into sealing engagement with said mating ring,
   a supporting sleeve extending coaxially within said sealing ring with axial ends extending in both directions axially beyond the mating ring,
      said sleeve being split axially with an axially extending gap therein and being flexible for conforming to the outer surface of a shaft,
   a torque ring having means for locking to a shaft and having an inwardly facing annular groove,
   a radially outwardly extending flange on one end of the sleeve seated in said groove,
   and means at the other end of said sleeve attaching the sleeve to said sealing ring.

6. In a rotary seal assembly, the combination comprising,
   a non-rotatable sealing ring having an annular radial sealing face,
   a rotatable mating ring having an annular radial sealing surface for sealing engagement with said face,
   a spring urging said sealing ring axially into sealing engagement with said mating ring,
   a supporting sleeve extending coaxially within said sealing ring with axial ends extending in both directions axially beyond the sealing ring,
      said sleeve being split axially with an axially extending gap therein and being flexible for conforming to the outer surface of a shaft,
   a torque ring,
   a radially inwardly extending set screw in said torque ring aligned with said sleeve gap for engaging the shaft and locking said torque ring to the shaft, means securing one end of the sleeve to the torque ring, and mating ring engaging means at the other end of the sleeve for connecting the sleeve to the mating ring for positively fixing the position of the mating ring.

7. In a rotary seal assembly, the combination comprising, a non-rotatable sealing ring having an annular radial sealing face, a rotatable mating ring having an annular radial sealing surface for sealing engagement with said face, a spring urging said sealing ring axially into sealing engagement with said mating ring, a supporting sleeve extending coaxially within said sealing ring with axial ends extending in both directions axially beyond the sealing ring, said sleeve being split axially with an axially extending gap therein and being flexible for conforming to the outer surface of a shaft, shaft engaging torque means at one end of the sleeve for positively connecting the sleeve to a shaft, and mating ring engaging means at the other end of the sleeve for connecting the sleeve to the mating ring and including a finger on the mating ring projecting into said sleeve gap for aiding in fixing the position of said mating ring.

8. In a rotary seal assembly, the combination comprising, a non-rotatable sealing ring having an annular radial sealing face and a radially outwardly facing annular groove, a rotatable mating ring having an annular radial sealing surface for sealing engagement with said face and having an annular inwardly facing groove, a resilient O-ring positioned in said mating ring groove for radially centering and supporting the mating ring on a rotatable shaft, a split annular tubular sheet metal sleeve with an axially extending gap therein having an inner cylindrical surface for being supported on a shaft and having radially outwardly extending flanges at the ends, a flange receiving groove in the mating ring receiving one of the sleeve flanges, a torque ring having an inwardly facing groove receiving the other of said sleeve flanges, a set screw threaded radially inwardly into the torque ring and positioned in said sleeve gap for engaging the outer surface of the shaft, a carrier ring being of rubber and having an annular outer portion with a cylindrical outer surface for engaging the inner surface of a housing opening and having a radially inwardly extending diaphragm portion with an inner edge received by the groove of said sealing ring and bonded to the sealing ring, a flange at said inner edge of the diaphragm portion extending rearwardly away from the sealing face of the sealing ring, an annular washer surrounding and seated on said flange, a spring engaging said washer for urging the sealing ring toward the mating ring, a rigid backing ring having a radially inwardly extending flange portion engaging said spring and having an axially extending outer flange portion supportingly engaging the outer portion of the carrier ring, and a finger on the mating ring extending into the gap in said sleeve.

References Cited by the Examiner

UNITED STATES PATENTS

| 2,037,144 | 4/36 | Olson | 277—40 |
| 2,247,505 | 1/39 | Kohler | 277—81 |
| 2,824,760 | 2/58 | Gits | 277—40 |

FOREIGN PATENTS

| 550,642 | 12/57 | Canada. |
| 735,591 | 8/55 | Great Britain. |

OTHER REFERENCES (A) Gits Shaft Seals, Form No. 113–66, 5/62. (Copy available in Group 360.)

(B) Gits Shaft Seals, Designs and Specification (page 7). (Copy available in Group 360.)

LEWIS J. LENNY, *Primary Examiner.*

SAMUEL ROTHBERG, *Examiner.*